Patented June 7, 1949

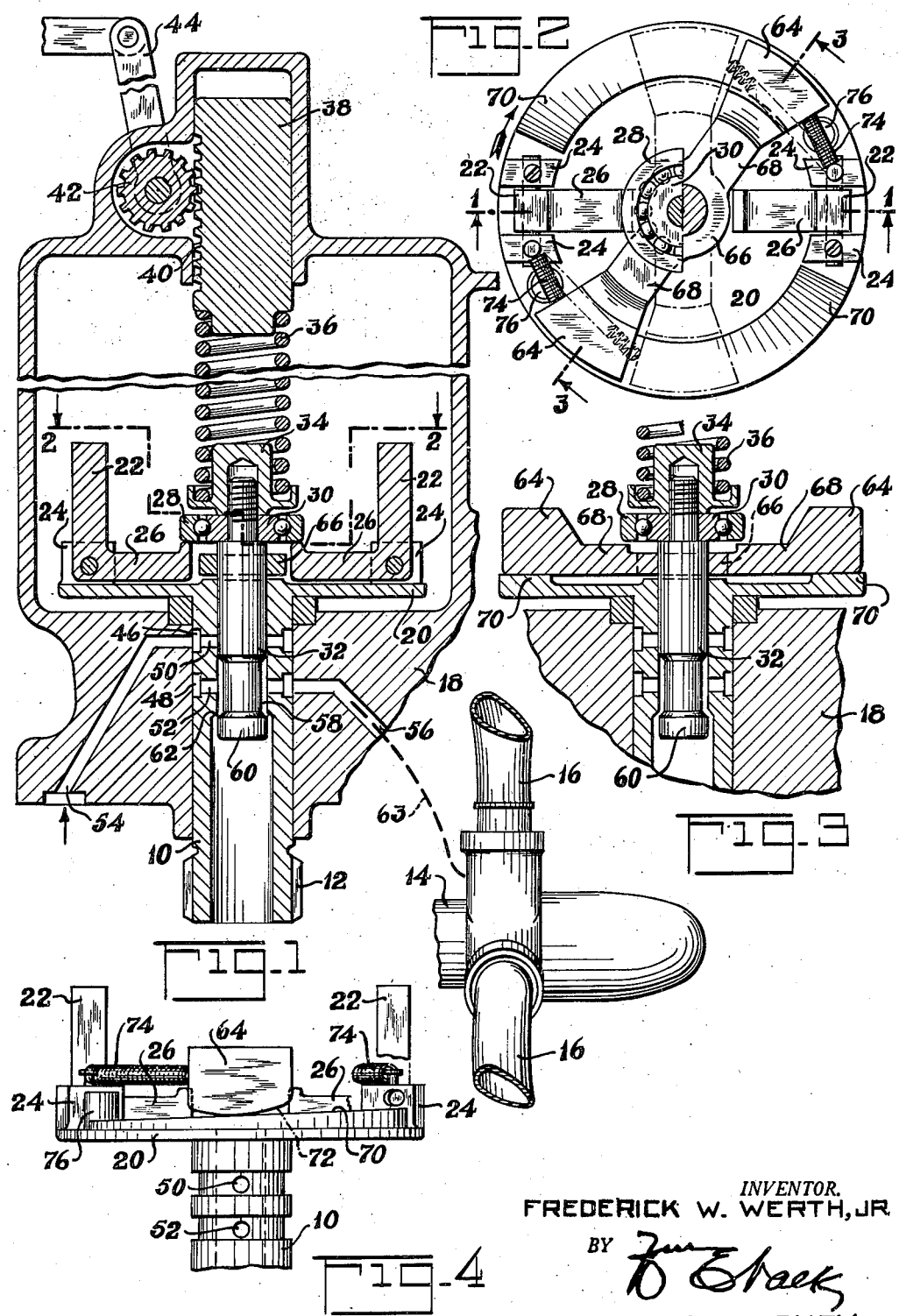

2,472,181

UNITED STATES PATENT OFFICE 2,472,181

PROPELLER GOVERNOR

Frederick W. Werth, Jr., Clifton, N. J., assignor to Wright Aeronautical Corporation, a corporation of New York Application July 7, 1944, Serial No. 543,812

8 Claims. (Cl. 264—6)

This invention relates to governors and is particularly directed to a speed controlled governor which is responsive not only to the speed of the mechanism controlled, but also to its acceleration.

This invention is illustrated and described in connection with a governor drivably connected to an aircraft engine, and arranged to control a fluid pressure for adjusting the pitch angle of the propeller blades in order to maintain a pre-set engine speed. This general combination is quite conventional and is disclosed in the co-pending application of C. W. Chillson, Serial No. 261,879, filed March 15, 1939, now Patent No. 2,449,452, in which the fluid pressure controlled by the governor actuates electric switch means, which in turn controls the operation of an electric motor to adjust the pitch of the propeller blades. Such a governor control system is used in the so-called "Curtiss electric propeller." It is also conventional practice to use the governor controlled fluid pressure directly for adjusting the pitch of the propeller blades. In either case the governor is of the centrifugal type in which a fluid valve is controlled by balancing the centrifugal force acting on a pair of engine driven rotating masses against a spring, and therefore, the movement of the valve depends on the magnitude of the deviation of the engine speed from the speed for which the governor is set.

In governors of either type there is danger of the engine overspeeding when the engine throttle valve is opened suddenly, e. g., during take-off of the aircraft, because the governor only responds to the actual deviation of the engine speed from its pre-set value. When the engine speed increases above its pre-set value and then subsequently returns to its pre-set value, the acceleration of the engine reaches a maximum value before the speed deviation is a maximum, in fact when the speed deviation is a maximum, the acceleration has already returned to zero. Therefore, by using the engine acceleration as well as the magnitude of its speed deviation for controlling the governor valve, a quicker initial adjustment of the governor valve may be obtained than by only using the magnitude of the speed deviation. Accordingly, it is an object of this invention to utilize both the rate of change of the engine speed as well as the magnitude of the engine speed for controlling the governor valve, and in this way, preventing serious overspeeding of the engine.

When the engine speed increases above a pre-set value and then returns thereto, the engine acceleration reaches a maximum value and returns to zero when the speed increase has reached its maximum value and then the engine decelerates and the speed returns to its pre-set value. Accordingly, if the governor valve is made to respond simultaneously to both engine speed deviation as well as to the rate of the speed change, the engine speed is liable to hunt, particularly if close regulation is maintained, as in the present aircraft engine governors. Accordingly, it is a further object of this invention so to arrange the governor mechanism responsive to the rate of change of the engine speed that it is only operative during periods of actual acceleration of the engine.

It is a further object of this invention to utilize an inertia mass or masses responsive to acceleration of the engine for controlling the engine speed. Specifically, the invention comprises the afore-described conventional speed controlling governor and in which a mass responsive to the acceleration of the engine is operative to provide a force against the governor spring in the same direction as the forces exerted by the speed responsive masses or flyweights of the governor.

Other objects of this invention will become apparent upon reading the annexed detailed description of the drawing in which:

Figure 1 is a sectional view of a governor embodying the invention, taken along line 1—1 of Figure 2;

Figure 2 is a sectional view taken along line 2—2 of Figure 1;

Figure 3 is a sectional view taken along line 3—3 of Figure 2; and

Figure 4 is a side elevation of the governor.

Referring to the drawing, the governor comprises a hollow sleeve 10 having a spline connection 12 at its lower end, adapted to be drivably connected to the engine (not shown) whose speed is to be regulated. The engine propeller shaft 14 is drivably connected to the propeller 16, and a conventional propeller pitch changing mechanism is incorporated within the hub and/or annular nose of the propeller.

The engine driven sleeve 10 is rotatable within the governor body portion 18, and terminates in a radially disposed plate 20 upon which a pair of diametrically opposed flyweights 22 are pivotally mounted between ears 24 on the plate 20. Each of the flyweights 22 is provided with an arm 26, extending radially inward and being adapted to engage an outer race 28 of a ball type thrust bearing. The inner race 30 of the thrust bearing is secured against a shoulder on the governor valve stem 32 by a nut 34, the valve stem being slidably mounted within the sleeve 10.

The governor is provided with a spring 36 disposed between the nut 34 and an adjustable stop 38. With this arrangement, upon engine operation, the sleeve 10 rotates at a speed proportional thereto, to drive the flyweights 22 which move radially outward in response to the centrifugal force acting thereon. This radially outward movement of the flyweights raises the thrust bearing 28, 30 and the valve stem 32 carried thereby against the governor spring 36. In this way the vertical position of the valve stem 32 depends on the engine speed.

For manually adjusting the position of the valve stem 32, the adjustable stop 38 is provided with rack teeth 40, engageable by a pinion 42. Lever means 44 are provided for rotating the pinion 42 to thereby adjust the governor spring 36 by adjusting the vertical position of the stop 38. Thus the valve stem 32 is movable upon changes in the speed of the engine and upon adjustment of the stop 38.

The sleeve 10 is provided with a pair of spaced annular grooves 46 and 48, having radial passages 50 and 52, respectively, extending inwardly therefrom. An oil pressure supply or inlet passage 54 extends through the governor body portion 18 to the annular groove 46 and an oil outlet passage 56 extends through the body portion 18 from the annular groove 48. The valve stem 32 is provided with an annular groove 58 adjacent its one end; thereby providing a head portion 60 at the end of the valve stem. The sleeve 10 is counterbored at its lower end to provide clearance as indicated at 62, between the valve stem head 60 and the walls of the sleeve when the valve stem is in its lower position.

In the position of the valve stem illustrated in Figure 1, the valve stem closes the inlet passage 54 which is supplied with engine lubricating oil under suitable pressure. The outlet passage 56 is opened to the interior of the hollow sleeve 10 through passage 52 and the clearance 62. The interior of the hollow sleeve 10 opens into the engine crankcase, thereby relieving any oil pressure within the outlet passage 56. Upon an increase in the engine speed, the flyweights 22 are operative to raise the valve stem 32 against the governor spring 36 whereupon the valve stem head 60 is received within the small diameter bore of the sleeve 10 to close the clearance 62, thereby preventing the escape of oil pressure into the engine crankcase through the hollow sleeve 10. Upward movement of the valve stem 32 also places the inlet oil pressure passage 54 in communication with the valve stem annular groove 58 and thence with the outlet passage 56.

The fluid pressure in the outlet passage 56 is operatively connected to the propeller pitch changing mechanism as schematically indicated by the dotted line 63 in Figure 1. The fluid pressure may be used directly for operating the pitch changing mechanism, or as illustrated in the aforementioned co-pending application of C. W. Chillson, this fluid pressure may be used to control electric switch means, which in turn controls the operation of the pitch changing mechanism. In any case, the particular means by which the fluid pressure in line 56 controls the pitch of the propeller blades, and therefore the engine speed, forms no part of the present invention. The structure so far described is conventional.

In order that the valve stem 32 respond to acceleration as well as to speed of the engine, a pair of inertia masses 64 are rotatably mounted about the valve stem 32 by a collar or hub 66 having arms 68 interconnecting the collar 66 with the inertia masses 64. A pair of cam surfaces 70 are formed on the plate 20 and each of the inertia masses 64 is respectively slidable over one of said cam surfaces. The cam engaging surfaces 72 of the inertia masses 64 are curved to facilitate sliding motion of these masses over the cam surfaces 70. The cam surfaces 70 are so arranged that as the inertia masses rotate counter-clockwise from their position illustrated in full lines in Figure 2, they ride up the cam surfaces to their dotted line position. In so doing, the arms 68, interconnecting the inertia masses 64 with their hub 66, engage the outer bearing race 28 to help raise the valve stem 32 against the governor spring 36. Light spring means 74 are provided to hold the inertia masses against resilient stops or bumpers 76 on the plate 20 during periods in which the engine is not accelerated. The relative disposition of the inertia masses 64 and the cam surfaces 70 is best seen in the side elevation view of Figure 4, in which the inertia masses are shown in a position corresponding to their position illustrated in dotted outline in Figure 2. With this construction, any rotation of the inertia masses 64 relative to the engine driven sleeve 10 is also accompanied by relative axial movement as enforced by the cam surfaces 70. That is, the cam surfaces 70 provide the inertia masses 64 with a helical-like path of movement relative to the engine driven sleeve 10. The particular shape of the cam surfaces 70 obviously need not be a true helix and is designed to give the inertia masses 64 the desired axial movement for a particular rotative movement relative to the sleeve 10.

With the governor plate 20 driven in the direction of the arrow in Figure 2, that is, clockwise, then upon acceleration of the engine, the inertia masses 64 will rotate counter-clockwise relative to the plate 20, thereby stretching their springs 74 as said inertia masses rotatively lag behind said plate 20. Accordingly, upon acceleration of the engine, this rotation of the inertia masses 64 over the cam surfaces 70 causes the arm 68 of the inertia masses to engage the outer race 28 of the ball thrust bearing to raise the valve stem 32 against the governor spring 36. Simultaneously, the resulting increase in the engine speed results in an increase in the centrifugal force acting on the flyweights 22, thereby further compressing the governor spring 36 and raising the valve stem 32. That is, upon acceleration of the engine, the valve stem 32 is raised, not only in the usual manner by the increased centrifugal force acting on the governor flyweights, but also, the resulting rotation of the inertia masses 64 exerts an additional force against the governor spring to help raise the valve stem. As soon as the engine acceleration ceases the springs 74 return the inertia masses to their normal position against the resilient stops or bumpers 76, whereupon the governor valve 32 is only controlled by the engine speed. That is, the inertia masses 64 are only effective to alter the normal operation of the governor during periods of engine acceleration, and when the engine is accelerated the inertia masses 64 and the governor flyweights 22 are both effective to raise the valve stem against the governor spring. The result is that during periods of engine acceleration, the governor in effect is fooled into believing that the engine speed is greater than it actually is to an extent dependent upon the magnitude of the acceleration, or looking at the result in a different manner, the governor is fooled into believing that it is set for a lower speed than it actually is.

When the inertia masses are held against the resilient stops 76 by the springs 74, the cam 70 provides for a slight clearance between the arms 68 of the inertia masses and the outer race 28 of the ball thrust bearing whereby the inertia masses have no effect on the governor when the engine is not accelerating, e. g., when the engine speed is constant or the engine is decelerating. Thus, with applicant's construction it is necessary for the engine acceleration to exceed a predetermined value before the acceleration forces acting on the inertia masses are large enough to overcome the forces of the springs 74 to an extent sufficient to move the inertia mass arms 68 against the bearing race 28 to help urge the governor valve 32 against the governor spring 36. Accordingly, because of the clearance between arms 68 and the outer race 28 of the thrust bearing and because of the springs 74, the acceleration responsive masses 64 are decoupled from the control valve 32 when the engine acceleration is small, thereby avoiding difficulties that might occur due to torsional vibrations or surging of the engine.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A speed control system for a mechanism, said system comprising a source of fluid pressure, means responsive to changes in the fluid pressure applied thereto for effecting adjustment of the speed of said mechanism, a valve member movable to control the application of fluid pressure to said means, spring means for urging said valve member in one direction, rotatable means drivably connected to said mechanism and carrying flyweight means operative to urge said valve member against said spring means in response to the centrifugal force acting on said flyweight means, inertia mass means carried by said rotatable means, said inertia mass means being movable relative to said rotatable means upon acceleration of said mechanism for urging said valve member against said spring means with a force varying with the magnitude of said acceleration, and resilient means carried by said rotatable driven means and operative to hold said inertia mass means against stop means on said rotatable means when the acceleration of said mechanism means is zero, said stop means being so disposed that said inertia mass means, when held thereagainst, is operatively disconnected from said valve member until the mechanism acceleration exceeds a predetermined value.

2. A speed control system for a mechanism comprising a member movable to regulate the speed of said mechanism, a spring for urging said member in one direction, a rotatable member drivably connected to said mechanism, flyweight means carried by said rotatable member and operative to urge said speed regulating member against said spring in response to the centrifugal force acting upon said flyweight means, and means operatively disconnected from said speed regulating member when the mechanism acceleration is less than a predetermined value and operatively connected to said speed regulating member at higher mechanism accelerations to urge said member against said spring with a force varying with the magnitude of said acceleration.

3. A speed control system for a mechanism comprising a member movable to regulate the speed of said mechanism, a spring for urging said member in one direction, a rotatable member drivably connected to said mechanism, flyweight means carried by said rotatable member and operative to urge said speed regulating member against said spring in response to the centrifugal force acting upon said flyweight means, and inertia mass means carried by said rotatable member, said inertia mass means being operatively disconnected from said speed regulating member when the mechanism has no acceleration or is decelerating and being movable relative to said mechanism rotated member upon acceleration thereof for urging said speed regulating member against said spring with a force varying with the magnitude of said acceleration.

4. A speed control system for a mechanism comprising a member movable to regulate the speed of said mechanism, a spring for urging said member in one direction, a rotatable member drivably connected to said mechanism, flyweight means carried by said mechanism driven member and operative to urge said speed regulating member against said spring in response to the centrifugal force acting on said flyweight means, inertia mass means carried by said mechanism driven member and rotatable with and relatively thereto about the axis of said member, resilient means for urging said inertia mass means toward stop means on said mechanism driven member, said inertia mass means being adapted to rotatively lag behind said mechanism driven member away from said stop means upon acceleration thereof for urging said speed regulating member against said spring with a force varying with the magnitude of said acceleration.

5. A speed control system for a mechanism comprising a member movable to regulate the speed of said mechanism, a spring for urging said member in one direction, a rotatable member drivably connected to said mechanism, flyweight means carried by said mechanism driven member and operative to urge said speed regulating member against said spring in response to the centrifugal force acting on said flyweight means, inertia mass means carried by said mechanism driven member and rotatable with and relatively thereto about the axis of said member, resilient means adapted to urge said inertia mass means toward stop means on said mechanism driven member, said inertia mass means being arranged to rotate relatively to said mechanism driven member away from said stop means and over a cam surface on said engine driven member upon acceleration of said mechanism, said cam surface being arranged to effect axial movement of said inertia mass means in response to said relative rotation for urging said speed regulating member against said spring with a force varying with the magnitude of said acceleration.

6. A speed control system for a mechanism comprising a rotatable member drivably connected to said mechanism, a member movable axially relative to said rotatable member for regulating of the speed of said mechanism, a spring for urging said regulating member in one axial direction, flyweights carried by rotatable member for urging said regulating member in the other axial direction against said spring with a force depending on the magnitude of the speed of said mechanism, and means having axial clearance relative to said regulating member when the mechanism acceleration is less than a predetermined low value and when said acceleration exceeds said low value, said means urges said regulating member against said spring with a force varying with the magnitude of said acceleration.

7. A speed control system for a mechanism comprising a member movable to regulate the speed of said mechanism, a spring for urging said member in one direction, a rotatable member drivably connected to said mechanism, flyweight means carried by said rotatable member and operative to urge said speed regulating member against said spring in response to the centrifugal force acting on said flyweight means, inertia mass means carried by said rotatable member and rotatable with and relatively thereto about the axis of said member, resilient means for urging said inertia mass means toward stop means on said rotatable member in which position said inertia mass means is operatively disconnected from said regulating member, said inertia mass means being adapted to rotatively lag behind said rotatable member away from said stop means upon mechanism acceleration and when said acceleration exceeds a predetermined value, said inertia mass means urges said speed regulating member against said spring with a force varying with the magnitude of said acceleration.

8. A speed control system for a mechanism comprising a member movable to regulate the speed of said mechanism; a first spring for urging said member in one direction; flyweight means drivably connected to said mechanism for rotation thereby, said flyweight means being arranged to urge said speed regulating member against said first spring with a first force in response to the centrifugal forces acting on said flyweight means; a rotatable member drivably connected to said mechanism; inertia mass means carried by and rotatable relative to said rotatable member; a second spring rotatable with said rotatable member for urging said mass means in the direction of rotation of said rotatable member toward abutment means carried by said rotatable member so as to hold said inertia mass in a fixed position relative to said rotatable member whenever said mechanism is decelerating or its acceleration is less than a predetermined value; said inertia mass means being arranged to rotatively lag behind said rotatable member away from said abutment means in opposition to said second spring in response to acceleration of said mechanism exceeding said predetermined value for urging said regulating member against said first spring with a second force varying with the magnitude of said acceleration.

FREDERICK W. WERTH, JR.

REFERENCES CITED

The following references are of record in the file of this patent:

UNITED STATES PATENTS

| Number | Name | Date |
|---|---|---|
| 664,392 | Ellicott | Dec. 25, 1900 |
| 683,688 | Hollingsworth | Oct. 1, 1901 |
| 805,392 | Warren | Nov. 21, 1905 |
| 959,853 | Grant | May 31, 1910 |
| 1,509,695 | Volet | Sept. 23, 1924 |
| 2,346,856 | Martin | Apr. 18, 1944 |

FOREIGN PATENTS

| Number | Country | Date |
|---|---|---|
| 415,112 | Great Britain | Aug. 20, 1934 |